United States Patent [19]

Shiohata et al.

[11] Patent Number: 4,635,210
[45] Date of Patent: Jan. 6, 1987

[54] METHOD OF AND APPARATUS FOR DETECTING CRACK CONDITION

[75] Inventors: Kouki Shiohata, Ibaraki; Kazuo Satoh, Kitaibaraki; Motoji Ohmori, Hitachi; Katsuaki Kikuchi, Tsuchiura; Ryoichi Kaneko, Hitachi, all of Japan

[73] Assignee: Hitachi, Ltd., Tokyo, Japan

[21] Appl. No.: 460,811

[22] Filed: Jan. 25, 1983

[30] Foreign Application Priority Data

Feb. 19, 1982 [JP] Japan ................................. 57-26456

[51] Int. Cl.$^4$ ........................................... G01M 7/00
[52] U.S. Cl. ..................................... 364/508; 73/570; 364/551
[58] Field of Search ............... 364/507, 508, 551, 552; 73/529, 598, 602, 660, 799, 570

[56] References Cited

U.S. PATENT DOCUMENTS

| 4,060,707 | 11/1977 | Olsson et al. | 73/462 |
| 4,408,294 | 10/1983 | Iman | 364/508 |
| 4,426,641 | 1/1984 | Kurlhara et al. | 364/508 |
| 4,453,407 | 6/1984 | Sato et al. | 364/508 |
| 4,482,859 | 11/1984 | Fournier | 73/579 |

Primary Examiner—Errol A. Krass
Attorney, Agent, or Firm—Antonelli, Terry & Wands

[57] ABSTRACT

Disclosed is a method for detecting the condition of a crack generated in a rotor of a rotary machine during an operation thereof to check whether the crack is developing or not. The number of revolutions of the rotor and oscillations of journal end portions of the rotor born by the bearings are continually detected. The detection of the crack condition is made on the basis of the detected signal corresponding to the waveform of each half of at least one cycle of the detected rotor oscillation. Disclosed also is an apparatus for carrying out the method.

9 Claims, 6 Drawing Figures

METHOD OF AND APPARATUS FOR DETECTING CRACK CONDITION

BACKGROUND OF THE INVENTION

1. Field of the Invention

The present invention relates to a method of and an apparatus for detecting the condition of a crack generated in a rotor of a rotary machine during an operation.

2. Description of the Prior Art

In recent years, as there is an increased demand for larger capacities of power plants such as thermoelectric power plants and nuclear power plants, the capacities of major equipments of these plants such as steam turbines, generators and so forth become larger. Therefore, any accident in the steam turbine or the generator may cause a serious problem such as an interruption of an electric power supply over a wide region or district.

In order to obviate such a problem, it becomes quite important that an abnormality occurring in the turbine or the like is detected at an early stage and a repair and that a replacement of parts be made promptly. The abnormality in such rotary machines is attributable to various causes and develops various symptoms among which an abnormal vibration of a motor of the rotary machine occurs most frequently and often causes serious accidents.

The abnormal vibration of the rotor is often caused by generation of a crack therein. Any crack generated in the rotor of a turbine or a generator tends to grow rapidly to cause a breakdown thereof, because such rotary machines are interrupted frequently in order to adjust a power supply in view of a load demand which varies according to seasons and even in a day.

Hitherto, the detection of the crack generated in the rotor has been made by a non-destructive inspection or the like measure at the time of a non-operation of the rotor, e.g. a fabrication of the rotor or a periodic inspection.

Some proposals have been made for detecting a crack in the rotor during the operation of the rotary machine. However, these proposals necessitate specific additional detecting devices which are generally expensive. Therefore, to provide for early detection of a crack in the rotor so as to avoid a serious accident in the rotary machine, it is necessary either to interrupt the operation of the rotary machine frequently to provide for non-destructive inspection of the rotor, or to provide the additional detecting devices for to the rotary machine. However, in the former case the rate of operation of the rotary machine is decreased. In the latter case the cost of the rotary machine is raised.

SUMMARY OF THE INVENTION

Accordingly, an object of the present invention is to provide a method of and an apparatus for detecting the condition of a crack generated in the rotor without any interruption of operation of the rotary machine and without any specific additional detecting equipment.

To this end, according to an aspect of the present invention, there is provided a method for detecting a condition of a crack generated in a rotor of a rotary machine during operation thereof, in which the number of revolutions of the rotor and oscillations on journal end portions of the rotor born by the bearing are continually detected, and wherein the detection of the crack condition is conducted on the basis of a detected signal corresponding to the waveform of each half of at least one cycle of the detected rotor oscillations.

According to another aspect of the present invention, there is provided an apparatus for detecting a condition of a crack generated in the rotor of a rotary machine during the operation thereof, the apparatus comprising: first sensing means for sensing the number of revolutions of the rotor and adapted to output a trigger command; and second sensing means for sensing oscillations of journal end portions of the rotor born by bearings and adapted for outputting a signal corresponding to the detected oscillations; wherein the apparatus further comprises an analog-to-digital converting means adapted to start a digitization of the signal from the second sensing means in response to the trigger command coming from the first sensing means; an arithmetic unit for processing the digitized signal from the analog-to-digital converting means, and a display for displaying the results of the processing.

In general, when a crack is generated in a rotor, an abnormal vibration of the rotor takes place due to a cyclic change of a bending stiffness in one revolution of the rotor.

These and other objects, features and advantages of the invention will become clear from the following description of the preferred embodiments taken in conjunction with the accompanying drawings.

DESCRIPTION OF THE PREFERRED EMBODIMENTS

Figure 1:
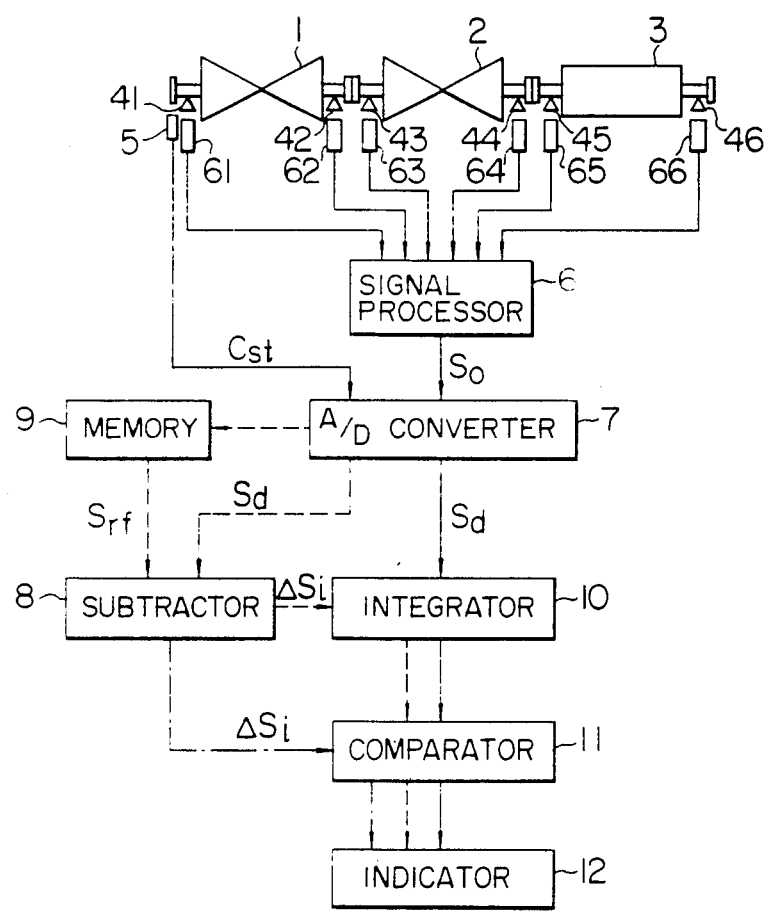
FIG. 1 is a block diagram of an embodiment of the present invention applied to a power plant having a steam turbine.

Referring first to FIG. 1, a power plant to which the present invention is applied has two steam turbines and a generator. The reference numerals 1 and 2 designate rotors of the steam turbines, respectively. The reference numeral 3 designates a rotor of the generator. The rotors 1, 2 and 3 are born at their journal portions by bearings 41 to 46. A reference numeral 5 designates a sensor for sensing the number of revolutions of the rotor 1 of the steam turbine. The sensor 5 is disposed adjacent to the bearing 41 bearing one of the journal portions of the rotor 1. The bearings 41 to 46 are provided with sensors 61 to 66 respectively, adapted for sensing the vibration of the journal portions of the rotors 1, 2 and 3 born by these bearings. The sensor 5 and the sensors 61 to 66 have been used conventionally to inform the operator of the conditions of the power plant.

The signals coming from the sensors 61 to 66 are delivered to a signal processor 6. The signal processor 6 delivers an oscillation signal So to an analog-to-digital converter 7 (A/D converter) in which the oscillation signal So is digitized. More specifically, in the A/D converter 7, the digitization of the oscillation signal So for a one cycle thereof is started by a trigger command Cst coming from the sensor 5, at a sampling number of 512 ($=2^9$) or 1024 ($=2^{10}$).

A detailed description will be made hereinafter as to the principle of judgement of the crack condition.

I. Relation Between Crack and Vibration

Figure 2:
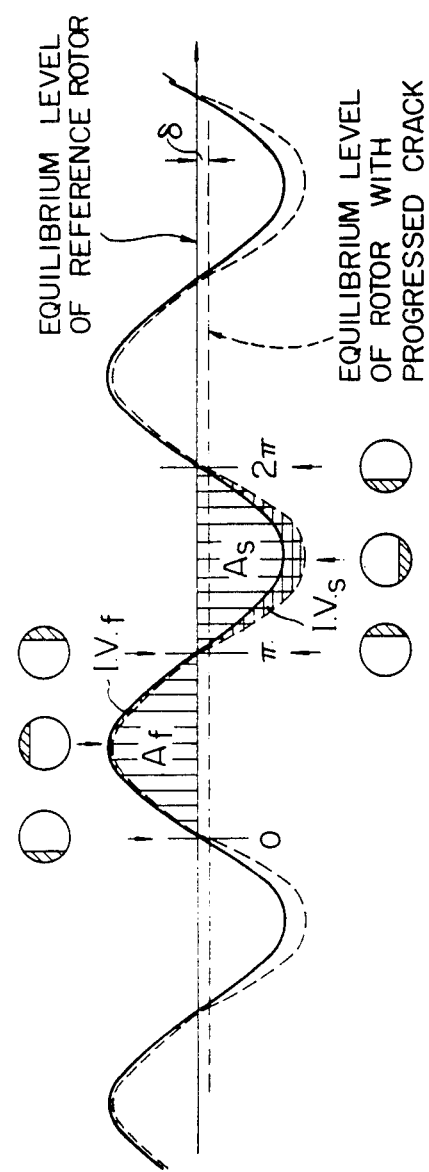
FIG. 2 is a chart showing a waveform of the oscillation of the rotor.
Figure 3:
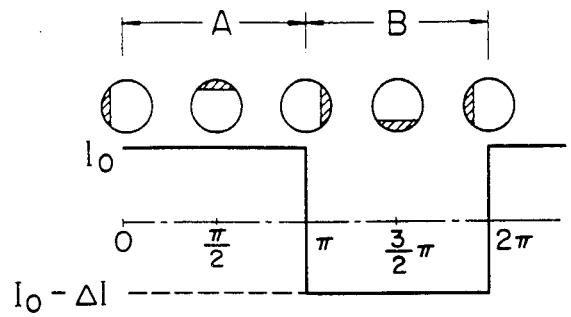
FIG. 3 is a diagrammatical representation of a change of a bending stiffness occurring in one cycle of revolution of the rotor.

The full-line curve in FIG. 2 shows the oscillation waveform series detected by the sensor when the rotor is rotating at a constant speed while there is no progress in a crack generated in the rotor. However, when there is any progress in the crack, the oscillation waveform series is changed as shown by the broken line in FIG. 2. When there is any progress in the crack, the bending stiffness of a cracked portion of the rotor is changed during one cycle of the rotation of the rotor. This cyclic change of the bending stiffness is shown in FIG. 3 in an exaggerated manner for an easier understanding. In this regard, the bending stiffness or the flexural rigidity is defined as EI, where E is the modulus of elasticity or Young's modulus and I is the moment of inertia of the cross section. When the rotor takes such a position that the crack is directed upwardly, i.e. in the direction opposite to the direction of the gravitational force, as in the range A in which the crack tends to be closed, the bending stiffness of the rotor is substantially equal to that of the rotor EIo in the initial period of use of the rotor, i.e., acts like a rotor without a crack. Namely there is little change of the oscillation waveform. On the contrary, when the crack is directed downwardly, i.e. in the same direction as the gravitational force, as in the range B in which the crack tends to be opened or progressed, the bending stiffness of the rotor is expressed by (EIo$-\Delta$EI) due to the bending stiffness loss ($-\Delta$EI). This change of the bending stiffness causes an increase of static deflection which in turn changes the static equilibrium level. Namely, when the crack tends to be closed, an equilibrium level of the cracked rotor substantially coincides with the equilibrium level of the rotor in the initial period of use, e.g. in the state immediately after the installation thereof when there is no crack. On the other hand, when the crack tends to be opened, the equilibrium level of the rotor significantly differs from that in the initial period of use by a value $\delta$, as will be seen from FIG. 2. In consequence, this difference causes a difference of the oscillation waveform between the rotor having any crack progress and the rotor in the initial period of use, i.e. the rotor having no crack progress. Namely, as will be seen from FIG. 2, the oscillation waveform of the cracked rotor (broken line) substantially coincides with that of the initial period of use of the rotor (full line) in the range in which the crack tends to be closed. The waveforms, however, do not coincide with each other in the range in which the crack tends to be opened.

II. Principle of Judgement (1) One of the methods for detecting the crack condition is to compare the area of oscillation waveform. According to this method, the digitized oscillation signal Sdi coming from the A/D converter 7 is delivered to an integrator 10 in which areas Af and As (see FIG. 2) of each wave half of one whole cycle is calculated in accordance with the following formulae (1) and (2).

$$A_f = \sum_{i=1}^{N/2} S_{di} \times \frac{2\pi}{N} \quad (1)$$

$$A_s = \sum_{i=N/2}^{N} S_{di} \times \frac{2\pi}{N} \quad (2)$$

where, N is the sampling number.

Figure 4:
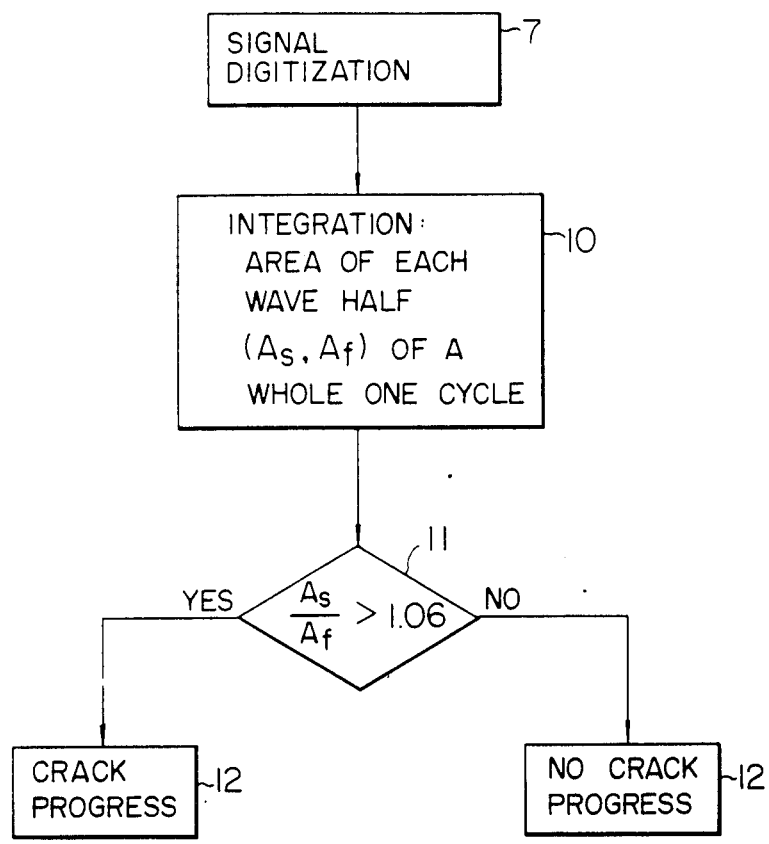
FIG. 4 is a flow chart of a process for detecting the crack.
Figure 6:
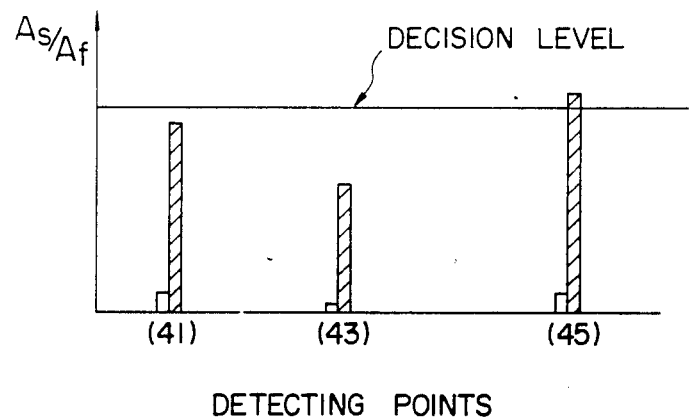
FIG. 6 is an illustration of an example of judgement or evaluation of the crack condition in accordance with the present invention.

If there is no progress in the crack, the first half part and the second half part of the oscillation waveform in a one cycle take substantially equal form as shown by the full-line curve, in the case where the rotor is rotating at a constant speed. Namely, there is a relationship expressed by Af=As. On the contrary, when there is any progress in the crack, the first half part and second half part of the waveform in a given cycle do not coincide with each other. More specifically, the areas Af and As take a relationship expressed by As/Af>1. Assuming here that the change in the waveform corresponds to the variance in the static deflection when a variance of 1 $\mu$m occurs at a speed of 3,000 r.p.m., the ratio of area is expressed by As/Af=1.015. Therefore, taking into account the measurement error and any possible influence of external noise, it is quite reasonable to judge that the crack is making a progress when the variance of the static deflection reaches 4 $\mu$m, i.e. when the ratio As/Af has come to take a value of about 1.06. Namely, although the ratio As/Af exceeding 1 (As/Af>1) is considered theoretically as an index or symptom of progress of the crack, it is reasonable and practical to judge that there is any progress in the crack when the ratio As/Af takes a value in excess of 1.06 (As/Af>1.06) (see FIG. 6). The process explained hereinbefore will be more fully understood referring to the full line flow shown in FIG. 1 and to the flow chart shown in FIG. 4.

Figure 5:
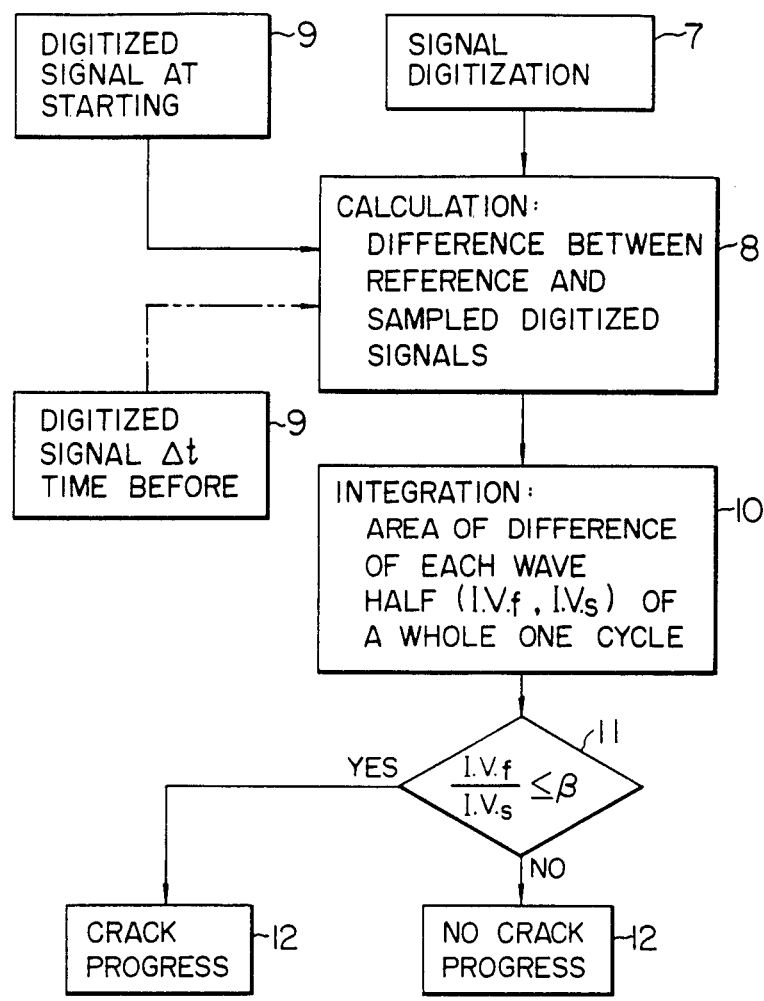
FIG. 5 is a flow chart of a modified process for detecting the crack.

(2) Hereinafter, an explanation will be made as to another principle of judgement. The process of this judgement is shown by broken line in FIG. 1 and in the flow chart shown in FIG. 5.

The digitized in oscillation signal Sd digitized the same manner as explained before in the A/D converter 7 is delivered to a subtractor 8. In advance of the delivery of the signal Sd, the signals detected by the sensors 61 to 66 in the initial period of use of the rotor, e.g. immediately after the installation of the steam turbine, are digitized the same manner as explained before and are memorized in the memory unit 9 as digitized reference signal Srf. The subtractor 8 determines a difference $\Delta$Si between the digitized oscillation signal Sdi detected at a sampling moment $t_i$ and the digitized reference signal $S_{rfi}$ memorized beforehand, and the difference $\Delta$Si is delivered to an integrator 10.

$$\Delta S_i = S_{di} - S_{rfi} \quad (3)$$

If a crack is generated in the rotor during operation thereof or if a crack has made any progress from the state in the initial period of use of the rotor, an abnormal signal component is added inevitably to the reference signal $S_{rf}$ to become a state of $\Delta Si \neq 0$, i.e. Srfi$\neq$Sdi. The relationship between the oscillation waveforms of the signals Srf and Sd is shown in FIG. 2.

The integrator 10 then integrates the difference signal $\Delta$Si for each wave half of a whole cycle of the signal Sd, so that integrated values I.V.f and I.V.s are obtained for the first wave half and for the second wave half, respectively, as follows.

$$I.V.f = \sum_{j=1}^{N/2} |\Delta Sij| \times \frac{2\pi}{N} \quad (4)$$

$$I.V.s = \sum_{j=N/2}^{N} |\Delta Sij| \times \frac{2\pi}{N} \quad (5)$$

where N is the sampling number.

As will be understood from the aforementioned description, when there is any progress in the crack of the rotor, the integrated value I.V.s takes a certain value although the integrated value I.V.f is almost zero. Namely, a ratio R=I.V.f/I.V.s takes an extremely small value. The value of the ratio R is then compared with a predetermined decision value $\beta$, which may be 0.95, for example.

Namely, it is judged that there is a progress in the crack, when the following condition is met.

$$R = I.V.f/I.V.s \leq \beta$$

According to this second embodiment, it is possible not only to detect the progress of the crack at an early stage but also to know the degree of progress of the crack. Namely, in this embodiment, it is possible to detect the secular change in the crack condition by using the oscillation waveform detected immediately after the installation of the turbine as the reference waveform which is memorized in the memory unit and compared with the detected oscillation waveform. In addition, by substituting the newly detected oscillation waveform for the memorized reference waveform at each time of the detection, i.e. by using the waveform detected $\Delta T$ time before as the reference waveform, it is possible to known the rate or speed of progress of the crack during $\Delta T$. Needless to say, it is necessary to change the predetermined decision value $\beta$ according to the change of the reference waveform.

In the embodiments described hereinbefore, the judgement as to the progress of the crack is made on the basis of the waveform of one whole cycle. However, this is not exclusive. A judgement can be made with higher reliability if the judgement is made on the basis of the mean values of area Af, As or the integrated values I.V.f, I.V.s calculated at the basis of the waveform detected during several cycles.

(3) As still another embodiment, it is possible to judge whether the crack is making progress by comparing the value $\Delta Sij$ with a predetermined reference value $\alpha$.

Namely, it is judged that the crack has made a progress when the following condition is met.

$$\Delta Sij > \alpha$$

This process is shown in FIG. 1 by a chain line.

(4) It is also possible to make the judgement by means of a square sum of the value $\Delta Sij$ or by means of the peak value of the amplitude.

It is still possible to indicate the reference signal and the detected signal simultaneously on a display to permit the operator to make a judgement as to whether the crack has made any progress.

As will be understood from the aforementioned description, according to the present invention, it is possible to detect the progress of a crack in the rotor without interruption of the rotary machine. In addition, it is not necessary to employ any specific additional detection devices because the progress of the crack can be detected by making use of sensors which have been used ordinarily in such rotary machines. Therefore, the present invention can be applied to any type of rotary machine having various capacities advantageously.

Although the present invention has been described through specific terms, it is to be noted here that the described embodiments are only illustrative and various changes and modifications may be imparted thereto without departing from the scope of the present invention which is limited solely by the appended claims.

What is claimed is:

1. A method for detecting a condition of a crack in a rotor of a rotary machine during operation thereof, comprising the steps of continuously detecting over a number of revolutions of the rotor the oscillations on journal portions of the rotor born by the bearings of the rotary machine to produce a detected signal representing said oscillations; and comparing a characteristic of the waveform of each half of at least one cycle of the detected rotor oscillations as indicated by said detected signal to one another to detect the condition of said crack.

2. A method as claimed in claim 1, wherein said detected signal is digitized for each half cycle of rotation of the rotor and the area under each half of the waveform for one cycle is calculated on the basis of the digitized detected signal and wherein the ratio of the areas under the respective halves of the waveform is also calculated and the detection of the crack condition is based on the magnitude of said ratio.

3. A method as claimed in claim 1, wherein said detected signal is digitized in one cycle of rotation of the rotor and a difference in one cycle between the digitized detected signal and a digitized reference signal which is preliminarily stored in a memory unit is calculated, and wherein the detection of the crack condition is based on the magnitude of said difference.

4. A method as claimed in claim 3, wherein an area difference between the area under the digitized detected signal and the area under the digitized reference signal is calculated per each half cycle of rotation of the rotor and the ratio of the area difference between both halves is also calculated, and wherein the detection of the crack condition is based on the magnitude of said ratio.

5. A method as claimed in claim 3 or 4, wherein said digitized reference signal is based upon a signal which has been previously detected and digitized.

6. An apparatus for detecting a condition of a crack in a rotor of a rotary machine during operation thereof, said apparatus comprising: first sensing means for sensing the number of revolutions of said rotor and for outputting a trigger command; second sensing means for sensing oscillations of journal portions of said rotor born by bearings of the rotary machine and for outputting signals corresponding to the detected oscillations; analog-to-digital converting means for effecting digitization of the signal from said second sensing means to produce a digital waveform signal in response to said trigger command from said first sensing means; an arithmetic unit for processing the digitized signal from said analog-to-digital converting means, including means for comparing a characteristic of the waveform of each half of one cycle of said oscillations to one another to detect the condition of said crack; and a display for displaying the results of said processing.

7. An apparatus as claimed in claim 6, wherein said arithmetic unit includes integrator means for calculating the area under each half of the waveform of one cycle of the detected oscillations and comparator means for comparing the areas under the respective halves.

8. An apparatus as claimed in claim 6, wherein said apparatus further comprises a memory unit in which a digitized reference signal from said analog-to-digital converting means corresponding to the signal from said second sensing means is memorized, and wherein said arithmetic unit includes means for detecting the difference between the digitized signal from said analog-to-digital converting means and the digitized reference signal from said memory unit, and a comparator for comparing said difference with a predetermined value.

9. An apparatus as claimed in claim 6, wherein said apparatus further comprises a memory unit in which a digitized reference signal from said analog-to-digital converting means corresponding to the signal from said second sensing means is memorized, and wherein said arithmetic unit includes means for detecting the difference between the digitized signal from said analog-to-digital converting means and the digitized reference signal from said memory unit, an integrator for calculating an area of said difference, and a comparator for comparing the value of said area and a predetermined reference value.

* * * * *